United States Patent
Vyas et al.

(10) Patent No.: US 9,429,667 B2
(45) Date of Patent: Aug. 30, 2016

(54) SYSTEMS AND METHODS FOR OPTIMAL STACKING OF SEISMIC DATA

(71) Applicants: Madhav Vyas, Houston, TX (US); Arvind Sharma, Houston, TX (US)

(72) Inventors: Madhav Vyas, Houston, TX (US); Arvind Sharma, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 759 days.

(21) Appl. No.: 13/855,783

(22) Filed: Apr. 3, 2013

(65) Prior Publication Data
US 2013/0286782 A1 Oct. 31, 2013

Related U.S. Application Data

(60) Provisional application No. 61/620,341, filed on Apr. 4, 2012.

(51) Int. Cl.
*G01V 1/28* (2006.01)
*G01V 1/36* (2006.01)

(52) U.S. Cl.
CPC .............. *G01V 1/282* (2013.01); *G01V 1/362* (2013.01); *G01V 1/28* (2013.01); *G01V 2210/322* (2013.01); *G01V 2210/667* (2013.01)

(58) Field of Classification Search
CPC .......... G01V 1/28; G01V 1/30; G01V 1/301; G01V 1/302; G01V 2210/64
USPC ............................ 367/38, 52, 53; 702/14, 16
See application file for complete search history.

(56) References Cited

U.S. PATENT DOCUMENTS

| | | | | |
|---|---|---|---|---|
| 5,563,949 A * | 10/1996 | Bahorich | ............... | G01V 1/301 702/16 |
| 5,930,730 A * | 7/1999 | Marfurt | ................. | G01V 1/288 702/16 |
| 5,940,778 A * | 8/1999 | Marfurt | .................... | G01V 1/28 702/16 |
| 2002/0116131 A1* | 8/2002 | Meek | ....................... | G01V 1/28 702/14 |
| 2010/0039894 A1* | 2/2010 | Abma | .................... | G01V 1/362 367/52 |
| 2011/0002194 A1* | 1/2011 | Imhof | ...................... | G01V 1/32 367/53 |

FOREIGN PATENT DOCUMENTS

GB 2385919 A 9/2003

OTHER PUBLICATIONS

Abma, Ray, et al., "Annual Meeting Selections 3D Interpolation of Irregular Data with POCS Algorithm," Geophysics, vol. 71, No. 6 (Nov.-Dec. 2006), pp. E91-E97 (7 p.).
Baysal, Edip, et al., "A Two-Way Nonreflecting Wave Equation," Geophysics, vol. 49, No. 2 (Feb. 1984), pp. 132-141 (10 p.).
(Continued)

*Primary Examiner* — Ian J Lobo
(74) *Attorney, Agent, or Firm* — Gunnar Heinisch

(57) ABSTRACT

Systems and methods include seismic data stacking derived from a set of image volumes. Stacking includes finding a sub-set of seismic image volumes (and in some implementations their respective stacking weights) or multiple realizations of sub-set of seismic image volumes from a given set that are consistent and similar to each other. Some or all of the input seismic image volumes can be stacked together as they would be with a conventional stack. However, the signal-to-noise ratio can be enhanced by only stacking those volumes that contain consistent and relevant information. Optimal stacking can utilize an algorithm that can be implemented in a moving window fashion.

20 Claims, 7 Drawing Sheets

(56) References Cited

OTHER PUBLICATIONS

Liu, Guochang, et al., "Stacking Seismic Data Using Local Correlation," Geophysics, vol. 74, No. 3 (May-Jun. 2009), pp. V43-V48 (6 p.).

Manning, Ted, et al., "Multi-Azimuth (MAZ) Towed Streamer Data Processing Flow from the Nile Delta," SEG/New Orleans 2006 Annual Meeting, pp. 2842-2846 (5 p.).

Manning, Ted, et al., "Quantifying and Increasing the Value of Multi-Azimuth Seismic," The Leading Edge, Apr. 2007, pp. 510-520 (9 p.).

Neelamani, Ramesh, et al., "Stack-and-Denoise: A New Method to Stack Seismic Datasets," SEG/New Orleans 2006 Annual Meeting, pp. 2827-2831 (5 p.).

Whitmore, N.D., "Seismic 10-Migration: Iterative Depth Migration by Backward Time Propagation," 53rd Annual SEG Meeting (1983), pp. 382-385 (4 p.).

Xu, Qing, et al., "Reverse Time Migration Using Vector Offset Output to Improve Subsalt Imaging—A Case Study at the Walker Ridge GOM," SEG San Antonio 2011 Annual Meeting, pp. 3269-3274 (6 p.).

Manning, T., et al., "Leveraging the Value of Multi-Azimuth (MAZ) Seismic Through MAZ-Stack," 70th EAGE Conference & Exhibition, Rome, Italy, Jun. 9-12, 2008 (8 p.).

Vyas, Madhav, et al., "Optimal Stacking," SEG Las Vegas 2012 Annual Meeting, pp. 1-5 (5 p.).

Raymond Abma and Nurul Kabir, "3D Interpolation of Irregular Data With A POCS Algorithm", Geophysics, vol. 71, No. 6, Nov.-Dec. 2006, pp. E91-E97, Houston, Texas.

Ozdogan Yilmaz, "Seismic Data Processing", Society of Exploration Geophysicists, 1987, chapter 1, pp. 9-81, Tulsa, OK.

Ozdogan Yilmaz, "3-D Seismic Exploration", Society of Exploration Geophysicists, 1987, Chapter 6, pp. 384-427, Tulsa, OK.

Grion, S. et al.: "Stacking weights determination by means of SVD and cross-correlation," Proceedings of the 68th Annual International Meeting, SEG, Expanded Abstracts, 1998, pp. 1135-1138, XP002719163, Sections: Summary and Theory.

Herrmann, F. et al.: "Edge preserved denoising and singularity extraction from angles gathers," SEG International Exposition and 72nd Annual Meeting, Oct. 2002, XP002719164, Section: Summary.

Liu, Guochang et al.: "Stacking seismic data using local correlation," Geophysics, Society of Exploration Geophysicists, US, vol. 74, No. 3, May 1, 2009, pp. V43-V48, XP001522546, ISSN: 0016-8033, DOI: 10.1190/1,3085643.

Sanchis, Charlotte et al.: "Enhanced local correlation stacking method," Geophysics, Society of Exploration Geophysicists, US, vol. 76, No. 3, May 1, 2011, pp. V33-V45, XP001574356, ISSN: 00168033, DOI: 10.1190/1.3552687.

\* cited by examiner

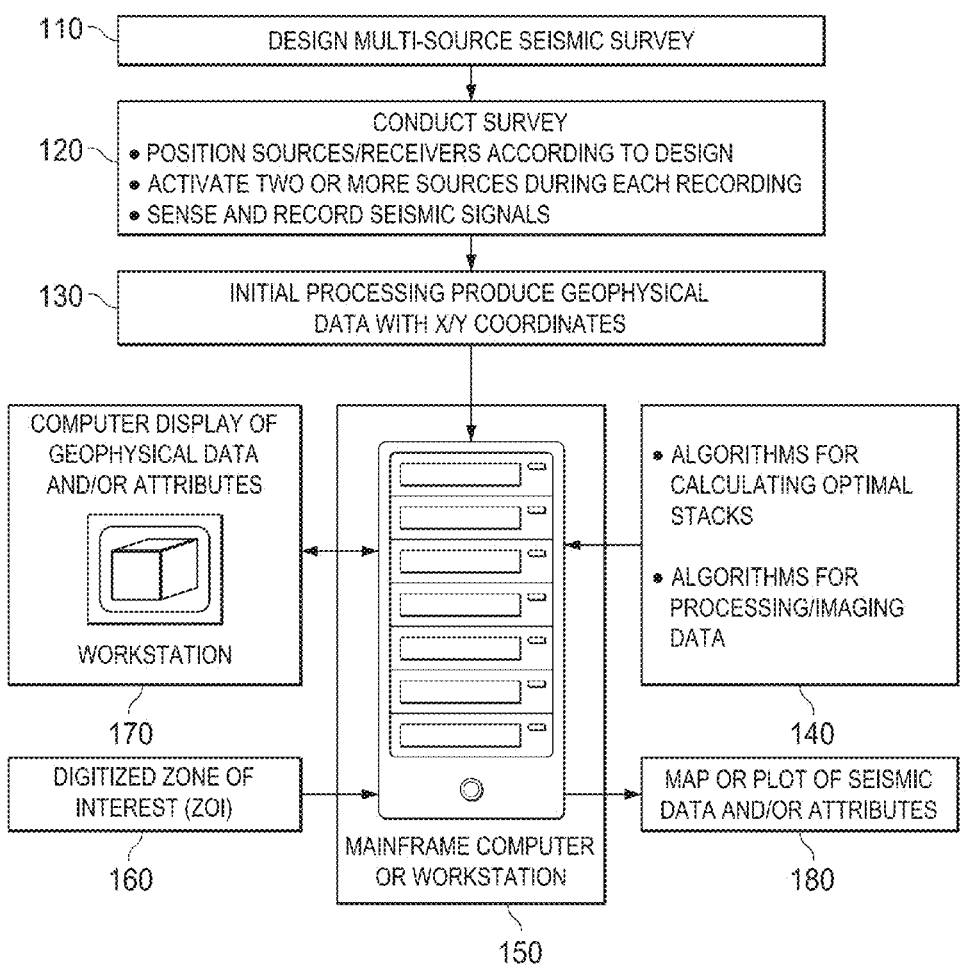

SYSTEMS AND METHODS FOR OPTIMAL STACKING OF SEISMIC DATA

CROSS-REFERENCE TO RELATED APPLICATIONS

This application claims priority to U.S. Provisional Application No. 61/620,341 filed Apr. 4, 2012, the disclosure of which is incorporated by reference herein in its entirety.

TECHNICAL FIELD

This disclosure relates generally to methods and systems for seismic exploration and, in particular, to methods for estimating seismic and other signals that are representative of the subsurface.

BACKGROUND

A seismic survey represents an attempt to image or map the subsurface of the earth by sending sound energy into the ground and recording the "echoes" that return from the rock layers below. The sound energy can originate, for example, from explosions or seismic vibrators on land environments, or air guns in marine environments. During a seismic survey, the sound energy source is placed at various locations near the surface of the earth above a geologic structure of interest. Each time the sound energy source is activated, it generates a seismic signal that travels downward through the earth, is reflected, and, upon its return, is recorded at multiple locations on the surface. Multiple sound energy source and recording combinations are then combined to create a near continuous profile of the subsurface, which may extend for many miles. In a two-dimensional (2-D) seismic survey, the recording locations are generally selected along a single line. In a three-dimensional (3-D) survey, the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey.

Also, a time lapse, often referred to as a four-dimensional (4-D) survey can be taken over the same survey area at two or more different times. The 4-D survey can measure changes in subsurface reflectivity over time. Changes in the subsurface reflectivity can be caused by, for example, the progress of a fire flood, movement of a gas/oil or oil/water contact, etc. If successive images of the subsurface are compared any changes that are observed (assuming differences in the source signature, receivers, recorders, ambient noise conditions, etc., are accounted for) can be attributable to the subsurface processes that actively occurring.

A seismic survey can be composed of a very large number of individual seismic recordings or traces. In a typical 2-D survey, there will usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing. General information pertaining to 3-D data acquisition and processing can be found in Chapter 6, pages 384-427, of Yilmaz.

A seismic trace can be a digital recording of the acoustic energy reflecting from inhomogeneities or discontinuities in the subsurface. A partial reflection occurs each time there is a change in the elastic properties of the subsurface materials. The digital samples in the seismic traces are often acquired at 0.002 second (2 millisecond or "ms") intervals, although 4 millisecond and 1 millisecond sampling intervals are also common. Each discrete sample, in a digital seismic trace, can be associated with a travel time, and in the case of reflected energy, a two-way travel time from the source to the reflector and back to the surface again, assuming, of course, that the source and receiver are both located on the surface. Many variations of the conventional source-receiver arrangement can be used, e.g. vertical seismic profiles (VSP) surveys, ocean bottom surveys, etc.

Further, the surface location of every trace in a seismic survey can be tracked and made a part of the trace itself (as part of the trace header information). This allows the seismic information contained within the traces to be later correlated with specific surface and subsurface locations. The tracking allows posting and contouring seismic data—and attributes extracted therefrom—on a map (i.e., "mapping").

The data in a 3-D survey can be viewed in a number of different ways. First, horizontal "constant time slices" can be extracted from a stacked or unstacked seismic volume by collecting all of the digital samples that occur at the same travel time. This operation results in a horizontal 2-D plane of seismic data. By animating a series of 2-D planes, it is possible to pan through the volume, giving the impression that successive layers are being stripped away so that the information, which lies underneath, can be observed. Similarly, a vertical plane of seismic data can be taken at an arbitrary azimuth through the volume by collecting and displaying the seismic traces that lie along a particular line. This operation, in effect, extracts an individual 2-D seismic line from within the 3-D data volume. It should also be noted that a 3-D dataset can be thought of as being made up of a 5-D data set that has been reduced in dimensionality by stacking it into a 3-D image. The dimensions can be time (or depth "z"), "x" (e.g., North-South), "y" (e.g., East-West), source-receiver offset in the x direction, and source-receiver offset in the y direction. While the examples here can apply to the 2-D and 3-D cases, the extension of the process to four or five dimensions can be achieved.

Seismic data, which has been acquired and processed, can provide a wealth of information to an explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the processing of seismic data, estimates of subsurface rock velocities can be generated and near surface inhomogeneities can be detected and displayed. In some cases, seismic data can be used to directly estimate rock porosity, water saturation, and hydrocarbon content. Seismic waveform attributes, such as phase, peak amplitude, peak-to-trough ratio, etc., can often be empirically correlated with known hydrocarbon occurrences and that correlation applied to seismic data collected over new exploration targets.

Seismic data stacking is one of type of applied processing/enhancement technique for seismic data. In simplest terms, stacking can include combining multiple seismic traces into a single trace for purposes of noise reduction. Conventional stacking can be ineffective for certain types of noise (e.g., where one or a few of the traces contain high amplitude noise). As such, there have been ongoing efforts to improve the quality of seismic stacking.

Stacking can be applied in both the data and the image domain. In the discussion here we describe the method as applicable to seismic images or seismic image volumes but it could be applied to seismic data using the same algorithm. Seismic images are occasionally further decomposed into a plurality of images, each one of which correspond to a subset of attributes, for example different opening angles, vector offsets, shot directions or any other possible attribute. However, these images need to be combined in order to obtain a high quality final image stack or multiple realizations of final image stack. This has led to a renewed interest in the process of stacking. To the extent that the stacking process can be improved, the final stacked data/image quality will similarly be improved. As such, there is a need for a methods and system of producing an improved stack of seismic data beyond the simple summation of all attribute subsets.

SUMMARY

According to implementations, systems and methods are provided for improving the process of stacking as applicable to seismic data or seismic image volumes. In implementations, optimal stacking includes finding a sub-set of seismic image volumes (and in some implementations their respective stacking weights) or multiple realizations of sub-set of seismic image volumes that are consistent and similar to each other from a given set of input seismic image volumes. A conventional or standard stacking procedure would sum all the input seismic image volumes together to obtain the final stacked seismic image volume. However, the signal-to-noise ratio of the composite image can be enhanced by only stacking those volumes that contain consistent and relevant information. One possible implementation is to have the optimal stacking method utilize an algorithm that can be implemented in a moving window fashion. At each image point all the subset volumes can be searched and those that satisfy a pre-defined criteria of similarity can be selected for the purpose of performing an optimized stack.

BRIEF DESCRIPTION OF THE DRAWINGS

Various features of the implementations can be more fully appreciated, as the same become better understood with reference to the following detailed description of the implementations when considered in connection with the accompanying figures, in which:

FIG. 1A illustrates an example of a general environment and processes associated with seismic stacking, according to various implementations.

FIGS. 6A-6D illustrate an example of decomposed images created from the data of FIG. 4F which contains the data represented by: FIG. 6A is the top 1% of wave-numbers in terms of energy; FIG. 6B is the next 5% of wave-numbers in terms of energy; FIG. 6C is the next 30% of wave-numbers in terms of energy; and FIG. 6D is the residual, according to various implementations.

DETAILED DESCRIPTION

Figure 1B:
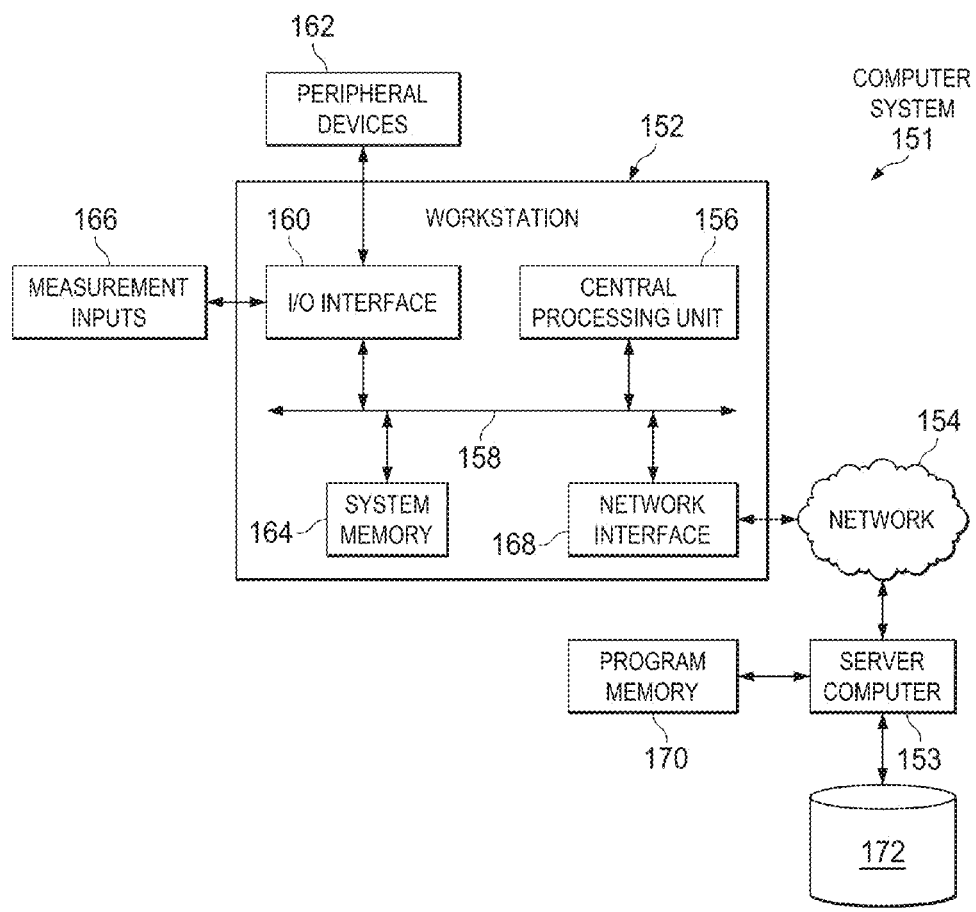
FIG. 1B illustrates an example of a computer system that can be utilized to perform processes described herein, according to various implementations.

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

FIG. 1A illustrates a general environment and processes for seismic exploration, according to various implementations. While FIG. 1A illustrates various components contained in the general environment and various stages of the processes, FIG. 1A is one example of an environment and processes, and additional components and stages can be added and existing components and stages can be removed.

As illustrated in FIG. 1A, at 110, a seismic survey can be designed by an explorationist to cover an area of economic interest. At 110, Field acquisition parameters (e.g., shot spacing, line spacing, fold, etc.) can be selected. Likewise, ideal design parameters or typical design parameters can be modified slightly (or substantially) in the field to accommodate the realities of conducting the survey. The selection or modification of the field acquisition parameters can be performed by the explorationist or automatically by a computer system in the environment, as described below.

At 120, seismic data (e.g., seismic traces) can be collected in the field over a subsurface target of potential economic importance. After collection, the seismic data can be sent to a processing center 150. The processing center 150 can execute one or more algorithms on the seismic data to condition the seismic data. The seismic data can be conditioned in order to make the seismic data more suitable for use in exploration. Likewise, the seismic data can be while the seismic data in the field, for example, by field crews.

The processing center 150 can perform a variety of preparatory processes 130 on the seismic data to make the seismic data ready for use by the explorationist. The processed seismic data can then be made available for use in the processes described herein. Likewise, the processed seismic data can be in one or more storage device, one a storage device, on hard disk, magnetic tape, magneto-optical disk, DVD disk, solid state storage device, storage network, or other mass storage means.

The processes disclosed herein can be implemented in the form of a computer program 140. The computer program 140 can be executed by one or more computer systems, such as the computer system described below, in the processing center 150. The one or more computer systems can be any type of convention computer system such as, mainframes, servers, and workstations, super computers and, more generally, a computer or network of computers that provide for parallel and massively parallel computations, wherein the computational load is distributed between two or more processors.

As illustrated in FIG. 1A, a digitized zone of interest model 160 can be supplied to the processing center and can be provided as input to the computer program 140. In the case of a 3-D seismic section, the zone of interest model 160 can include specifics as to the lateral extent and thickness (which might be variable and could be measured in time, depth, frequency, etc.) of a subsurface target. The exact means by which such zones are created, picked, digitized, stored, and later read during program execution are known to those skilled in the art, and those skilled in the art will recognize that this might be done any number of ways.

The computer program 140 can be conveyed into the one or more computer systems that is to execute it by one or more storage devices such as a floppy disk, a magnetic disk, a magnetic tape, solid state storage device, a magneto-optical disk, an optical disk, a CD-ROM, a DVD disk, a RAM card, flash RAM, a RAM card, a PROM chip, or loaded over a network. In implementations, the processes described herein can be made part of a larger package of software modules that is designed to perform any of the processes described herein. After performing the processes described herein, the resulting output can be sorted into gathers, stacked, and displayed either at display 170, e.g., a high resolution color computer monitor, or in hard-copy form as a printed seismic section or a map 180. The explorationist can then use the resulting output to assist in identifying subsurface features conducive to the generation, migration, or accumulation of hydrocarbons. The identification of subsurface features conducive to the generation, migration, or accumulation of hydrocarbons can be performed by a computer system in the environment, as described below.

FIG. 1B illustrates an example of a computer system 151, which can be used in the processing center 150 and can perform processes described herein, according to various implementations. As illustrated, the computer system 151 can include a workstation 152 connected to a server computer 153 by way of a network 154. While FIG. 1B illustrates one example of the computer system 151, the particular architecture and construction of the computer system 151 can vary widely. For example, the computer system 151 can be realized by a single physical computer, such as a conventional workstation or personal computer, or by a computer system implemented in a distributed manner over multiple physical computers. Accordingly, the generalized architecture illustrated in FIG. 1B is provided merely by way of example.

As shown in FIG. 1B, the workstation 152 can include a central processing unit (CPU) 156, coupled to a system bus (BUS) 158. An input/output (I/O) interface 160 can be coupled to the BUS 158, which refers to those interface resources by way of which peripheral devices 162 (e.g., keyboard, mouse, display, etc.) interface with the other constituents of the workstation 152. The CPU 156 can refer to the data processing capability of the workstation 152, and as such can be implemented by one or more CPU cores, co-processing circuitry, and the like. The particular construction and capability of the CPU 156 can be selected according to the application needs of the workstation 152, such needs including, at a minimum, the carrying out of the processes described below, and also including such other functions as can be executed by the computer system 151. A system memory 164 can be coupled to system bus BUS 158, and can provide memory resources of the desired type useful as data memory for storing input data and the results of processing executed by the CPU 156, as well as program memory for storing computer instructions to be executed by the CPU 156 in carrying out the processes described below. Of course, this memory arrangement is only an example, it being understood that system memory 164 can implement such data memory and program memory in separate physical memory resources, or distributed in whole or in part outside of the workstation 151. Measurement inputs 166, such as seismic data, that can be acquired from different sources can be input via I/O interface 160, and stored in a memory resource accessible to the workstation 152, either locally, such as the system memory 164, or via a network interface 168.

The network interface 168 can be a conventional interface or adapter by way of which the workstation 152 can access network resources on the network 154. As shown in FIG. 1B, the network resources to which the workstation 152 can access via the network interface 168 includes the server computer 153. The network 154 can be any type of network or combinations of network such as a local area network or a wide-area network (e.g. an intranet, a virtual private network, or the Internet). The network interface 168 can be configured to communicate with the network 154 by any type of network protocol whether wired or wireless (or both).

The server computer 153 can be a computer system, of a conventional architecture similar, in a general sense, to that of the workstation 152, and as such includes one or more central processing units, system buses, and memory resources, network interfaces, and the like. The server computer 153 can be coupled to a program memory 170, which is a computer-readable medium that stores executable computer program instructions, such as the computer program 140, according to which the processes described below can be performed. The computer program instructions can be executed by the server computer 153, for example in the form of a "web-based" application, upon input data communicated from the workstation 152, to create output data and results that are communicated to the workstation 152 for display or output by the peripheral devices 162 in a form useful to the human user of the workstation 152. In addition, a library 172 can also available to the server computer 153 (and the workstation 152 over the network 154), and can store such archival or reference information as may be useful in the computer system 151. The library 172 can reside on another network and can also be accessible to other associated computer systems in the overall network.

Of course, the particular memory resource or location at which the measurements, the library 172, and the program memory 170 physically reside can be implemented in various locations accessible to the computer system 151. For example, these measurement data and computer program instructions for performing the processes described herein can be stored in local memory resources within the workstation 152, within the server computer 153, or in network-accessible memory resources. In addition, the measurement data and the computer program instructions can be distributed among multiple locations. It is contemplated that those skilled in the art will be readily able to implement the storage and retrieval of the applicable measurements, models, and other information useful in connection with implementations, in a suitable manner for each particular application.

Figure 2:
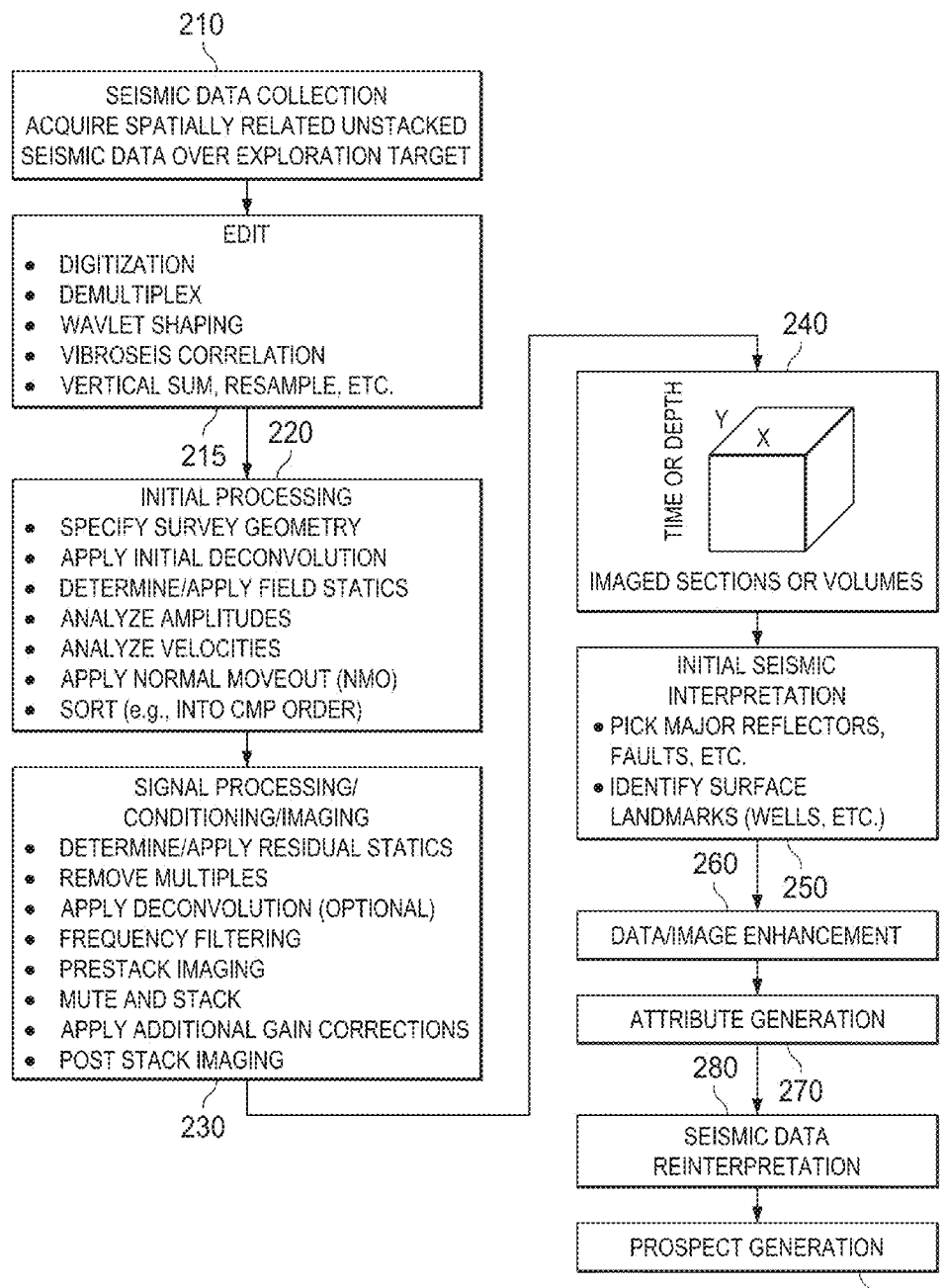
FIG. 2 illustrates an example of seismic processing sequence suitable for use seismic stacking, according to various implementations.

In implementations, the processes described herein can be made a part of and incorporated into an overall seismic process. FIG. 2 illustrates an example of an overall seismic process, according to various implementations. Those of ordinary skill in the art will recognize that the stages illustrated in FIG. 2 are only broadly representative of the sorts of processes that might be applied to such data and the choice and order of the processing stages, and the particular algorithms involved, can vary depending on the one or more computer systems performing the processes, the signal source (dynamite, vibrator, Sosie™ mini-Sosie™, etc.), the survey location (land, sea, etc.) of the data, the processing center that processes the data, etc. In implementations, the process of FIG. 2 can be performed by any of the components of the general environment illustrated in FIGS. 1A and 1B.

As illustrated in FIG. 2, in 210, a 2-D or 3-D seismic survey can be conducted over a particular volume of the earth's subsurface. The data collected in the field can consist of unstacked (i.e., unsummed) seismic traces which contain digital information representative of the volume of the earth lying beneath the survey. Processes by which such data are obtained and processed into a form suitable for use by the components of the general environment illustrated in FIGS. 1A and 1B are well known to those of ordinary skill in the art.

The purpose of a seismic survey can be to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3-D seismic survey or, an unstacked 3-D portion of a 3-D seismic survey. The processes described herein can be applied to a group of seismic traces that have an underlying spatial relationship with respect to some subsurface geological feature. Again for purposes of illustration only, the processes can be described in terms of traces contained within a 3-D survey (stacked or unstacked as the discussion warrants), although any assembled group of spatially related seismic traces could conceivably be used.

After the seismic data are acquired, the seismic data can be input to a processing center where some initial or preparatory processing steps are applied to them. In 215, the seismic data can be edited in preparation for subsequent processing. For example, the editing can include demux, gain recovery, wavelet shaping, bad trace removal, etc. In 220, initial processing can be performed on the seismic data. The initial processing can include specification of the geometry of the survey and storing of a shot/receiver number and a surface location as part of each seismic trace header. Once the geometry has been specified, it can be customary to perform a velocity analysis and apply an normal move out (NMO) correction to correct each trace in time to account for signal arrival time delays caused by offset.

After the initial pre-stack processing is completed, in 230, the seismic data can be conditioned before creating stacked (or summed) data volumes. FIG. 2 illustrates a typical "Signal Processing/Conditioning/Imaging" processing sequence, but those skilled in the art will recognize that many alternative processes could be used in place of the ones listed in the figure. In any case, the seismic data can be processed appropriately for use in the production of a stacked seismic volume or, in the case of 2-D data, a stacked seismic line for use in the exploration for hydrocarbons within the subsurface of the earth.

In 240, digital samples within a stacked seismic volume can be uniquely identified. Any digital sample within a stacked seismic volume is uniquely identified by a (X, Y, TIME) triplet, with the X and Y coordinates representing some position on the surface of the earth, and the time coordinate measuring a recorded arrival time within the seismic trace. For example, the X direction can correspond to the "in-line" direction, and the Y measurement can correspond to the "cross-line" direction, as the terms "in-line" and "cross-line" are generally understood in the art. Although time is the most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

In 250, an initial interpretation can be performed on the stacked volume. The explorationist can do an initial interpretation of the resulting stacked volume. In the initial interpretation, the explorationist can locate and identify the principal reflectors and faults wherever they occur in the data set. The initial interpretation can also be performed by any of the components of the general environment as illustrated in FIGS. 1A and 1B.

In 260, additional data enhancement can be performed. In 270, the stacked or unstacked seismic data and/or attribute generation can be performed. In 280, the seismic data can be reinterpreted. For example, the explorationist can revisit the original interpretation in light of the additional information obtained from the data enhancement and attribute generation. The reinterpretation can be performed by any of the components of the general environment as illustrated in FIGS. 1A and 1B.

In 290, prospects for the generation, accumulation, or migration of hydrocarbons can be determined. For example, the explorationist can use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons. The prospects for the generation, accumulation, or migration of hydrocarbons can be performed by any of the components of the general environment as illustrated in FIGS. 1A and 1B.

Implementations of the present disclosure are directed to the process of optimal stacking disclosed herein is to find a sub-set of seismic image volumes (and possibly their respective stacking weights) or multiple realizations of sub-set of seismic image volumes that are consistent and similar to each other from a given set of input seismic image volumes. The signal-to-noise ratio can be enhanced by only stacking those volumes that contain consistent and relevant information. This approach differs from a conventional stack which would stack together all of the input image volumes with equal weights to produce an image of the subsurface. The current approach differs from the conventional workflow in two ways, first, it selects a sub-set of seismic image volumes for the purpose of stacking based on a pre-defined measure of similarity and second, it can produce multiple realizations of sub-set of seismic image volumes for the purpose of stacking leading to multiple realizations of final image stack, with each realization using a different combination of input seismic image volumes. This approach would prove effective when the signal is consistent across multiple seismic image volumes, that represent the same sub-surface region, while the noise is not. For example, in case of a seismic image, it would be assumed that real reflection events can be consistent across all the image volumes while other types of noises such as, migration artifacts can change from one volume to another.

In implementations, the processes described herein can be implemented in a "moving-window" fashion. The sub-set of volumes used in creating an optimal stack can change from one part of the image to another based on the decomposition and illumination pattern of the image. As mentioned above, the process described herein can produce multiple realizations of the optimally stacked seismic image volumes to use. For example, in the presence of conflicting dips, one set of image volumes can be illuminating a particular dip while a different set illuminates another dip. In an instance such as this it might be desirable to compute two sub-sets of seismic image volumes to effectively capture both the events, as described below.

Figure 3:
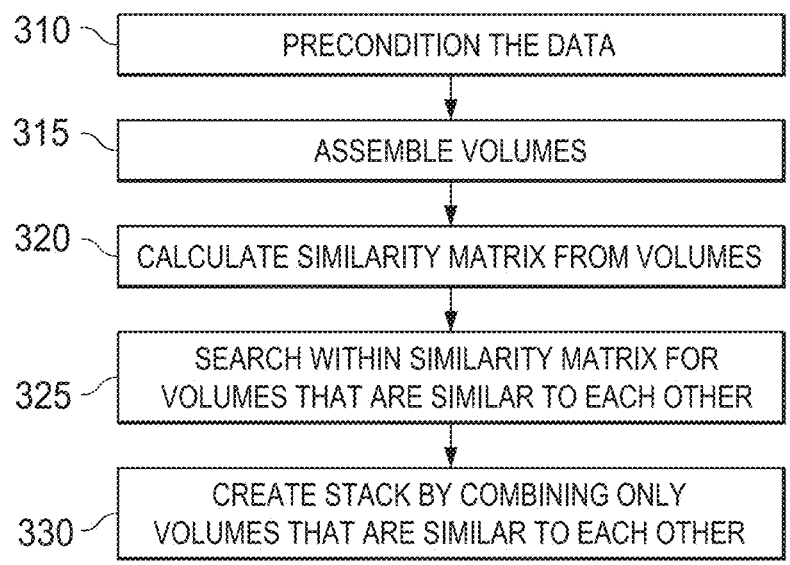
FIG. 3 illustrates an example of a process for seismic stacking, according to various implementations.
Figure 4A:
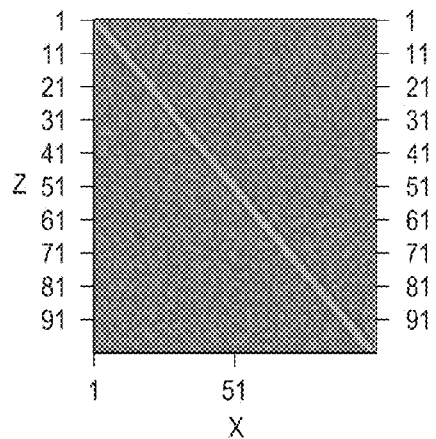
FIGS. 4A-4F illustrate some examples of input image volumes, according to various implementations.
Figure 4B:
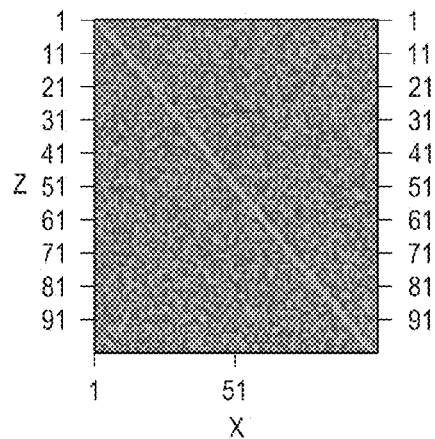
Figure 4C:
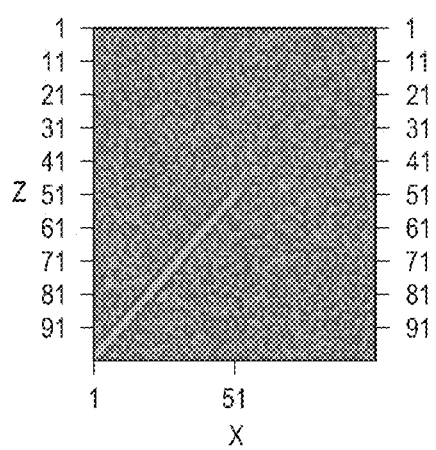
Figure 4D:
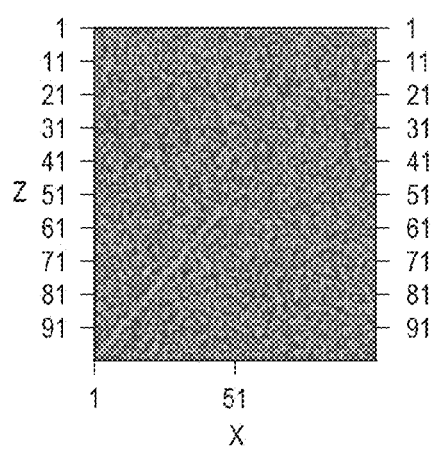
Figure 4E:
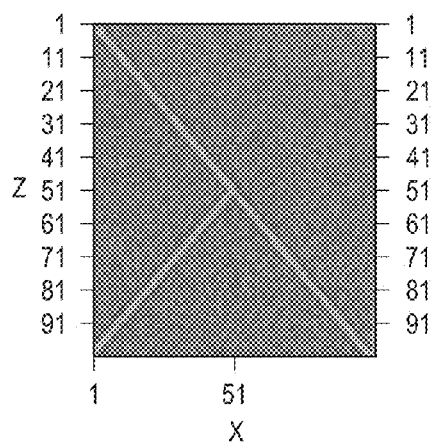
Figure 4F:
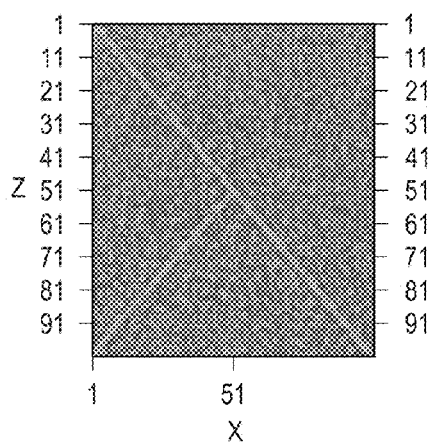

FIG. 3 illustrates an example of a process for seismic stacking, according to various implementations. While FIG. 3 illustrates various processes that can be performed by one or more computer system, such as computer system 151 of the processing center 150, any of the processes and stages of the processes can be performed by any component of the general environment in FIGS. 1A and 1B or any computer system. Likewise, the illustrated stages of the processes are examples and any of the illustrated stages can be removed, additional stages can be added, and the order of the illustrated stages can be changed. In some implementations, the process can be used in connection with steps 230 and/or 260 of the generalized processing sequence illustrated in FIG. 2. Additionally, in some implementations, the process can be performed as a stand-alone process or used with other seismic processes.

In 310, the computer system 151 can precondition the seismic data. However, 310 can be optionally based on the seismic data utilized. In 315, the computer system 151 can assemble the volumes of the seismic data. Before beginning the seismic stacking, the computer system 151 can further separate the image volumes into their respective principal components. For example, the computer system 151 can utilize Singular Value Decomposition or Fourier domain decomposition or a projection on convex sets (POCS) algorithm such as that taught by Abma and Kabir, 2006 (i.e., *3D interpolation of irregular data with a POCS algorithm*, Ray Abma and Nurul Kabir, 2006, Geophysics, 71, E9), the disclosure of which is incorporated herein by reference. If n volumes are provided as input and each of those volumes is further decomposed into m volumes, it would result in m×n volumes. The decomposition would make the process fairly expensive; nevertheless, it could have its own merits with some data sets.

In some implementations, the input seismic image volumes can correspond to different reflection/opening angles and/or different azimuths or vector offsets (Xu et. al., 2011, SEG Expanded Abstracts), etc. In any case, the individual elements of seismic image volumes that are stacked together or otherwise combined can be elements that represent the same subsurface region/points. Volumes that might be suitable for use with the instant invention might be created by decomposing seismic image volumes using opening angles, or vector offsets, or shot directions, or principal components, or wave numbers, and/or various other attributes.

In 320, the computer system 151 can calculate similarity matrix from the volumes. For example, the computer system 151 can determine a metric of similarity between multiple volumes of data or image. The similarity between any two volumes can be defined in different ways. For instance, the computer system 151 can compute the zero lag cross-correlation between two volumes. For a given set of n volumes one approach would be to construct an n×n matrix S such that the elements of that matrix represent a similarity metric for every volume with every other volume.

$$S = \begin{pmatrix} s_{11} & s_{12} & \ldots & \ldots & s_{1n} \\ \ldots & \ldots & s_{ji} & \ldots & \ldots \\ \ldots & s_{ij} & s_{ii} & \ldots & \ldots \\ \ldots & \ldots & \ldots & \ldots & \ldots \\ s_{n1} & \ldots & \ldots & \ldots & s_{nn} \end{pmatrix}$$

where, $s_{ij}$ represents the similarity between volume i and volume j. In such an arrangement, the diagonal elements of the similarity matrix S can all be equal to unity if a normalized (e.g., correlation coefficient-type) measure of similarity is used. For most applications the matrix can also be symmetric. As mentioned earlier, there can be different ways to compute this matrix and the choice of a technique is also very much dependent on the final application. A few possibilities are described below.

When working with multiple volumes of seismic images, the semblance between seismic image volumes can be used as a metric of similarity. Alternatively, instead of computing semblance directly from the image volume it can also be computed from some attribute of the image such as the dip field or semblance could be computed by using the illumination map corresponding to the seismic image volume or semblance could be computed by using the phase/amplitude map corresponding to the seismic image volume. Another mathematical operation that measures the similarity or coherence other than semblance could be used as well. This by no means is an exhaustive list of techniques that can be used but only a few suggestions.

In 325, the computer system 151 can search within the similarity matrix for volumes that are similar to each other. After a similarity matrix has been calculated, the computer system can conduct a search identify elements that are similar to each other. The computer system 151 can utilize various techniques to search. For example, the computer system 151 can use a technique similar to a greedy search algorithm. This algorithm amounts to finding a chain of elements that are related to each other and identifying the volumes that comprise an optimal sub-set.

Conceptually, the algorithm can be described by the following pseudo-code:

```
do {
    i. Search for the biggest element in the matrix, say, s_ij
    ii. Search for the next biggest element that is either similar to element
    i or element j
    iii. Check if it meets threshold criteria
        a. If yes, include that element and set its similarity s_ij and s_ji
        equal to zero,
        b. If not, EXIT
    iv. Update the matrix
}
```

Note that although both $s_{ij}$ and $s_{ji}$ were set equal to zero in the foregoing, such a value would not have to be used if only half of the similarity matrix were calculated and used (i.e., because of the symmetry of that matrix $s_{ij}$ would normally be expected to be equal to $s_{ji}$). The threshold criteria could simply compare the absolute value of the element (for which the decision needs to be taken) with the threshold value provided or it could compare the ratio of current element (for which the decision needs to be taken) and the previously selected element with the threshold number provided. The rationale behind choosing a threshold is whether or not the included element can add more consistent information than inconsistent noise.

This algorithm can result in a chain (series) of elements that represents a sub-set the most similar seismic image volumes from a given input set of seismic image volumes. In order to avoid local maxima, the process can begin with different seeds and each seed will lead to a different answer, in this case a different chain of elements from the similarity matrix. In order to select one answer over another we define the "quality" value of each chain. Once the "quality" value of each chain is quantified, the chains can be ranked accordingly. There is some subjectivity and freedom involved with how this "quality" value is defined and calculated. For example, the computer system 151 can choose the "quality" value such that the average similarity coefficient is maximized without using too little or too many elements. The "quality" value could be specific to the data and also the purpose.

In order to compute multiple realizations of sub-set of similar and coherent seismic volumes we run the above mentioned procedure again but now with the updated similarity matrix (where previously selected elements, $s_{ij}$ and $s_{ji}$, have been set equal to zero)

In 330, the computer system 151 can create the stack by combining volumes that are similar to each other. For example, the computer system 151 can perform a brute stack of the elements identified in the chain. Likewise, the computer system 151 can perform a weighted stack. The weights can be derived from the similarity indices computed at the earlier step.

The description below describes some examples of the processes discussed above. It should be understood and remembered that the following are just examples of how the processes can operate in practice and should not be used to limit the present disclosure.

1. The Numbers Test

To demonstrate the processes, an extremely simple example can be considered first. Suppose there is provided a set of ten random numbers

X={0.2, 0.17, 0.25, 0.31, 0.08, 0.9, 0.63, 0.11, 0.67, 0.53}

The following can be defined as the similarity metric for purposes of the instant example:

$$S_{ij} = \frac{(i+j)^2}{2(i^2+j^2)}$$

When i=j, the similarity index can be equal to unity and can be less than 1 otherwise. The more dissimilar the numbers are the lower the similarity index. The similarity matrix can be calculated according to the equation set out above and then a search can be conducted for chains of similar elements. In this particular example, the similarity matrix is:

|      | 0.20  | 0.17  | 0.25  | 0.31  | 0.08  | 0.90  | 0.63  | 0.11  | 0.67  | 0.53  |
|------|-------|-------|-------|-------|-------|-------|-------|-------|-------|-------|
| 0.20 | 1.000 | 0.993 | 0.988 | 0.956 | 0.845 | 0.712 | 0.788 | 0.922 | 0.774 | 0.830 |
| 0.17 | 0.993 | 1.000 | 0.965 | 0.922 | 0.885 | 0.682 | 0.752 | 0.956 | 0.738 | 0.791 |
| 0.25 | 0.988 | 0.965 | 1.000 | 0.989 | 0.790 | 0.758 | 0.843 | 0.869 | 0.828 | 0.886 |
| 0.31 | 0.956 | 0.922 | 0.989 | 1.000 | 0.742 | 0.808 | 0.896 | 0.815 | 0.881 | 0.936 |
| 0.08 | 0.845 | 0.885 | 0.790 | 0.742 | 1.000 | 0.588 | 0.625 | 0.976 | 0.618 | 0.648 |
| 0.90 | 0.712 | 0.682 | 0.758 | 0.808 | 0.588 | 1.000 | 0.970 | 0.620 | 0.979 | 0.937 |
| 0.63 | 0.788 | 0.752 | 0.843 | 0.896 | 0.625 | 0.970 | 1.000 | 0.669 | 0.999 | 0.993 |
| 0.11 | 0.922 | 0.956 | 0.869 | 0.815 | 0.976 | 0.620 | 0.669 | 1.000 | 0.660 | 0.699 |
| 0.67 | 0.774 | 0.738 | 0.828 | 0.881 | 0.618 | 0.979 | 0.999 | 0.660 | 1.000 | 0.987 |
| 0.53 | 0.830 | 0.791 | 0.886 | 0.936 | 0.648 | 0.937 | 0.993 | 0.669 | 0.987 | 1.000 |

In this particular example, two sets of similar numbers result when a threshold of about 0.95 is used:

Y1={0.63, 0.67, 0.53, 0.9}

Y2={0.20, 0.17, 0.25, 0.31, 0.11}

In this particular case, random numbers that are nearly equal result in high similarities and, hence, they tend to be included in the same set. The same can occur with seismic images. Instead of a single numeric value the data values in the S matrix can be computed from some property of the associated seismic data and, clearly, another definition of the similarity metric can be selected. But after that definition has been chosen, rest of the process can be essentially the same for seismic data volumes as it was in the current example. The current example has two sets of similar numbers which may be the case when actual seismic is used in areas with conflicting dips or multiple reflection events.

2. Synthetic 2D Test

Consider next a synthetic 2D seismic example. There are six image volumes as shown in FIGS. 4A-4F and all of them have different levels of signal and noise. The objective is to find a combination that when compared with a raw stack, improves the signal-to-noise ratio while preserving the information.

In this example, the first step in the process of optimal stacking is to compute the similarity matrix. Here, a normalized zero-lag cross-correlation can be used as a metric of similarity, although those of ordinary skill in the art will readily be able to adapt and use alternative measures of similarity. The similarity matrix at each location (x,y) can be defined for purposes of this embodiment to be:

$$S_{ij} = \frac{\sum\limits_{ky=y-wy/2}^{ky=y+wy/2}\sum\limits_{kx=x-wx/2}^{kx=x+wx/2} I_i(kx,ky)I_j(kx,ky)}{\sqrt{\sum\limits_{ky=y-wy/2}^{ky=y+wy/2}\sum\limits_{kx=x-wx/2}^{kx=x+wx/2} I_i(kx,ky)I_i(kx,ky)}\sqrt{\sum\limits_{ky=y-wy/2}^{ky=y+wy/2}\sum\limits_{kx=x-wx/2}^{kx=x+wx/2} I_j(kx,ky)I_j(kx,ky)}}$$

In this example, $w_x$ and $w_y$ define a window in the neighborhood of (x,y).

Figure 5A:
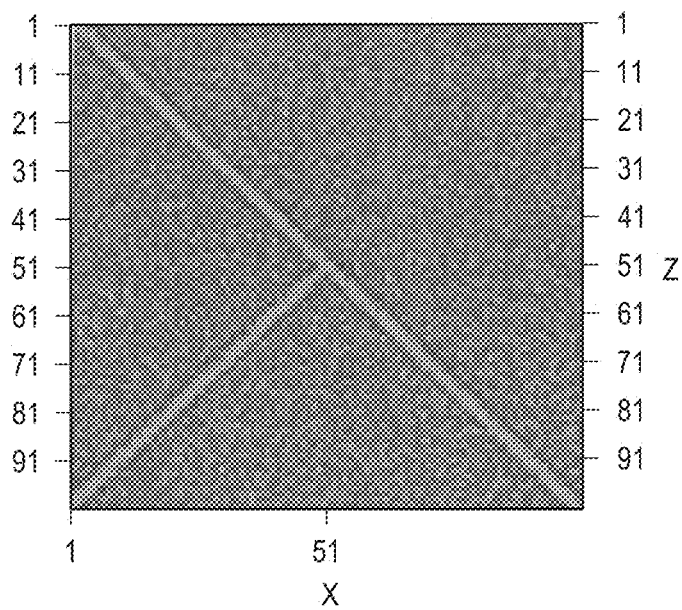
FIGS. 5A and 5B illustrate an example of raw stack and optimal stack data sets obtained from the data of FIGS. 4A-4F, according to various implementations.
Figure 5B:
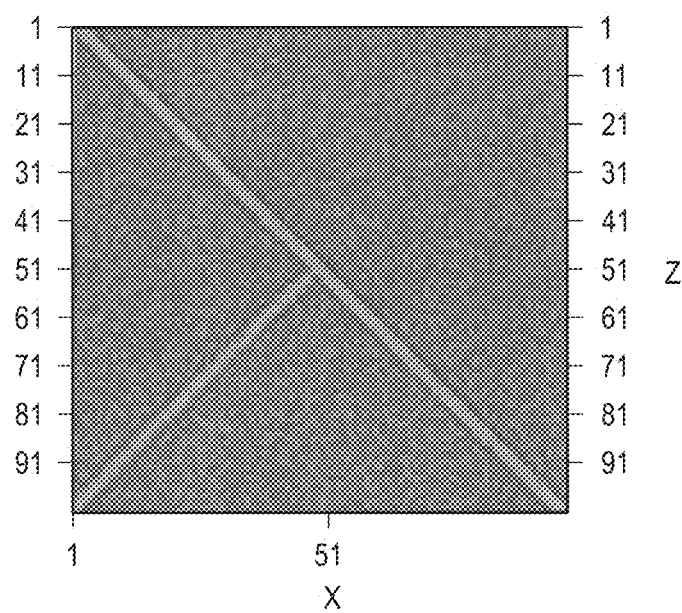

Next, after computing the similarity matrix a search was conducted within the similarity matrix for an optimal tree. In this particular, case elements 'a', 'e', and 'f' (refer to FIGS. 4A, 4E, and 4F) were found to be the optimal elements. The result of the optimal stack is compared with the raw stack in FIGS. 5A and 5B. Notice that there is a significantly reduced the amount of random noise present in the image. The image FIG. 5A is a raw stack and the image of FIG. 5B corresponds to an optimal stack calculated according to the processes described herein.

Figure 6B:
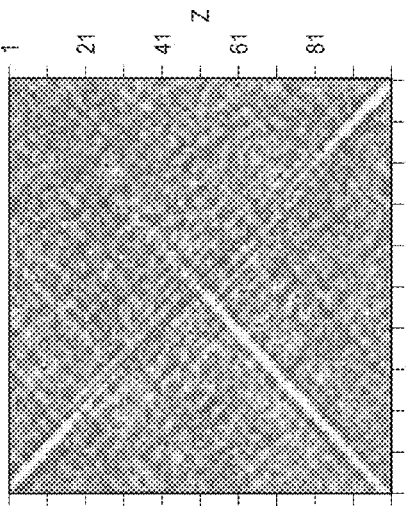
Figure 6D:
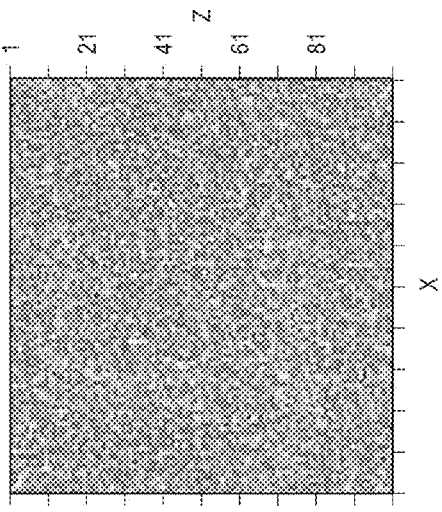
Figure 6A:
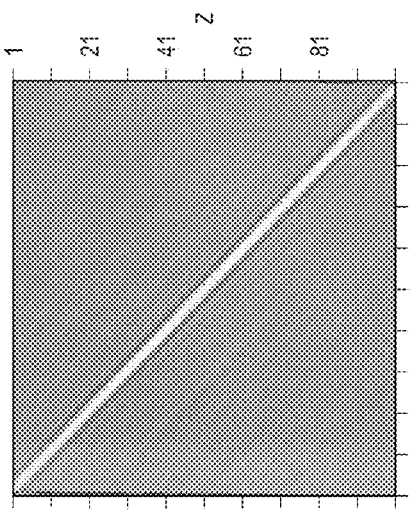
Figure 6C:
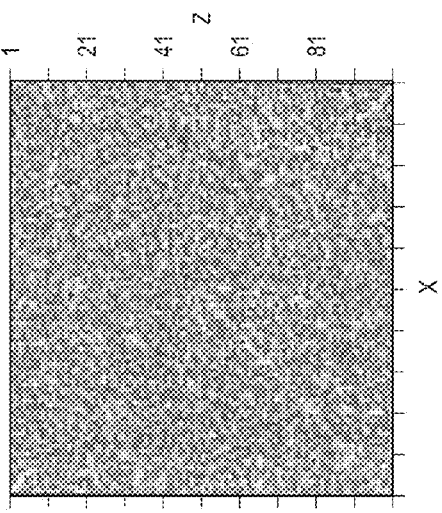

As was mentioned previously, pre-processing can be performed before the images are processed. One option would be to decompose the image in the Fourier domain. This can be useful when selection or rejection of the entire volume/image is not desirable but, instead, where use of only parts of the volume/image is desired. In the instant example, there are six different input images. It is desirable, for purposes of the instant example, to further decompose each of these into four different images. The decomposition is based on the energy content in the Fourier domain. FIGS. 6A-6D show the decomposed images created from FIG. 4F. FIG. 6A represents the top 1% of the wave-numbers in terms of energy, FIG. 6B is the next 5%, FIG. 6C is the next 30% and FIG. 6D is the residual. In this particular example, 24 intermediate images were produced and were used as input to optimal stacking workflow. The advantage of such procedure should be obvious, in that the elimination of inconsistent noise is more effective.

In the previous discussion, the language has been expressed in terms of operations performed on collections and/or volumes of conventional seismic data. But, it is understood by those skilled in the art that the invention herein described could be applied advantageously in other subject matter areas, and used to locate other subsurface minerals besides hydrocarbons.

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the processes can be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Those skilled in the art will recognize that these and other variations are possible within the spirit and scope as defined in the following claims and their equivalents.

What is claimed is:

1. A method for seismic exploration above a region of the subsurface containing structural or stratigraphic features conducive to the presence, migration, or accumulation of hydrocarbons, the method comprising:
   accessing a seismic survey containing seismic traces acquired proximate to the region of the subsurface;
   forming a set of a plurality of volumes of the seismic traces prior to any stacking of the plurality of volumes, each volume of the set of the plurality of volumes of the seismic traces imaging at least approximately a same subregion of the subsurface region;
   calculating a similarity matrix from the set of the plurality of volumes of the seismic traces;
   selecting, based on the similarity matrix, a subset of correlated volumes of the set of the plurality of volumes, wherein the subset of correlated volumes comprises volumes of the set of the plurality of volumes determined to be similar to one another;
   combining the subset of correlated volumes of the plurality of volumes into a single volume, or multiple realizations thereof, of seismic image volumes or traces; and
   outputting the single volume, or multiple realizations thereof, of image volumes or seismic traces for use with the seismic exploration above the region of the subsurface containing structural or stratigraphic features conducive to the presence, migration, or accumulation of hydrocarbons.

2. The method of claim 1, wherein combining the subset of correlated volumes of the set of the plurality of volumes comprises stacking the subset of correlated volumes of the set of the plurality of volumes into the single volume, or multiple realizations thereof, of image volumes or seismic traces.

3. The method of claim 1, wherein selecting, based on the similarity matrix, the subset of correlated volumes, comprises:
   using the similarity matrix in connection with a greedy search algorithm to determine the volumes of the set of the plurality of volumes similar to one another.

4. The method of claim 1, wherein selecting, based on the similarity matrix, the subset of correlated volumes of the set of the plurality of image volumes, comprises:
   searching for a largest element in the similarity matrix, $s_{ij}$, where $s_{ij}$ is a non-diagonal element in the similarity matrix in row "i" and column "j",
   searching the similarity matrix for a next largest element in either $s_i$. or $s_{.j}$, where "$s_i$." represents row "i" of the similarity matrix and "$s_{.j}$" represents column "j" of the similarity matrix,
   if the next largest element itself, or its ratio with the previously selected element, is greater than or equal to a threshold value,
   selecting a volume represented by the next largest element and setting $s_{ij}$ and $s_{ji}$ of the similarity matrix equal to zero, if the next largest element itself, or its ratio with the previously selected element, is less than the threshold value, ending the search, and, performing the searching until the next largest element is less than said threshold value.

5. A system for seismic exploration above a region of the subsurface containing a structural or stratigraphic features conducive to the presence, migration, or accumulation of hydrocarbons, the system comprising:

a memory storing instructions; and a processor coupled to the memory and configured to execute the instructions to perform a method comprising:

accessing a seismic survey containing seismic traces acquired proximate to the region of the subsurface;

forming a set of a plurality of volumes of the seismic traces prior to any stacking of the plurality of volumes, each volume of the set of the plurality of volumes of the seismic traces imaging at least approximately a same subregion of the subsurface region;

calculating a similarity matrix from the set of the plurality of volumes of the seismic traces;

selecting, based on the similarity matrix, a subset of correlated volumes of the set of the plurality of volumes, wherein the subset of correlated volumes comprises volumes of the set of the plurality of volumes determined to be similar to one another;

combining the subset of correlated volumes of the plurality of volumes into a single volume, or multiple realizations thereof, of seismic image volumes or traces; and outputting the single volume, or multiple realizations thereof, of image volumes or seismic traces for use with the seismic exploration above the region of the subsurface containing structural or stratigraphic features conducive to the presence, migration, or accumulation of hydrocarbons.

6. The system of claim 5, wherein combining the subset of correlated volumes of the set of the plurality of volumes comprises stacking the subset of correlated volumes of the set of the plurality of volumes into the single volume, or multiple realizations thereof, of image volumes or seismic traces.

7. The system claim 5, wherein selecting, based on the similarity matrix, the subset of correlated volumes, comprises:

using the similarity matrix in connection with a greedy search algorithm to determine the volumes of the set of the plurality of volumes similar to one another.

8. The system of claim 5, wherein selecting, based on the similarity matrix, the subset of correlated volumes of the set of the plurality of image volumes, comprises:

searching for a largest element in the similarity matrix, $s_{ij}$, where $s_{ij}$, is a non-diagonal element in the similarity matrix in row "i" and column "j", searching the similarity matrix for a next largest element in either $s_i$. or $s._j$, where "$s_i$." represents row "i" of the similarity matrix and "$s._j$" represents column "j" of the similarity matrix, if the next largest element itself, or its ratio with the previously selected element, is greater than or equal to a threshold value, selecting a volume represented by the next largest element and setting $s_{ij}$, and $s_{ji}$, of the similarity matrix equal to zero, if the next largest element itself, or its ratio with the previously selected element, is less than the threshold value, ending the search, and, performing the searching until the next largest element is less than said threshold value.

9. A computer readable storage medium comprising instructions for causing one or more processors to perform a method for seismic exploration above a region of the subsurface containing structural or stratigraphic features conducive to the presence, migration, or accumulation of hydrocarbons, the method comprising:

accessing a seismic survey containing seismic traces acquired proximate to the region of the subsurface;

forming a set of a plurality of volumes of the seismic traces prior to any stacking of the plurality of volumes, each volume of the set of the plurality of volumes of the seismic traces imaging at least approximately a same subregion of the subsurface region;

calculating a similarity matrix from the set of the plurality of volumes of the seismic traces;

selecting, based on the similarity matrix, a subset of correlated volumes of the set of the plurality of volumes, wherein the subset of correlated volumes comprises volumes of the set of the plurality of volumes determined to be similar to one another;

combining the subset of correlated volumes of the plurality of volumes into a single volume, or multiple realizations thereof, of seismic image volumes or traces; and outputting the single volume, or multiple realizations thereof, of image volumes or seismic traces for use with the seismic exploration above the region of the subsurface containing structural or stratigraphic features conducive to the presence, migration, or accumulation of hydrocarbons.

10. The computer readable storage medium of claim 9, wherein combining the subset of correlated volumes of the set of the plurality of volumes comprises stacking the subset of correlated volumes of the set of the plurality of volumes into the single volume, or multiple realizations thereof, of image volumes or seismic traces.

11. The computer readable storage medium of claim 9, wherein selecting, based on the similarity matrix, the subset of correlated volumes, comprises:

using the similarity matrix in connection with a greedy search algorithm to determine the volumes of the set of the plurality of volumes similar to one another.

12. The computer readable storage medium of claim 9, wherein selecting, based on the similarity matrix, the subset of correlated volumes of the set of the plurality of image volumes, comprises:

searching for a largest element in the similarity matrix, $s_{ij}$, where $s_{ij}$, is a non-diagonal element in the similarity matrix in row "i" and column "j", searching the similarity matrix for a next largest element in either $s_i$. or $s._j$, where "$s_i$." represents row "i" of the similarity matrix and "$s._j$" represents column "j" of the similarity matrix, if the next largest element itself, or its ratio with the previously selected element, is greater than or equal to a threshold value, selecting a volume represented by the next largest element and setting $s_{ij}$, and $s_{ji}$, of the similarity matrix equal to zero, if the next largest element itself, or its ratio with the previously selected element, is less than the threshold value, ending the search, and, performing the searching until the next largest element is less than said threshold value.

13. The method of claim 1, wherein combining the subset of correlated volumes of the plurality of volumes into multiple realizations of volumes comprises utilizing a different combination of input seismic image volumes for each respective realization of the multiple realizations of volumes.

14. The method of claim 1, comprising selecting, based on the similarity matrix, a second subset of correlated volumes of the set of the plurality of volumes as the subset of correlated volumes, wherein the second subset of correlated volumes comprises volumes of the set of the plurality of volumes determined to be similar to one another.

15. The method of claim 14, wherein selecting the second subset of correlated volumes is performed in a moving-window fashion.

16. The method of claim 1, wherein the subset of correlated volumes comprises volumes of the set of the plurality of volumes determined to be similar to one another through zero lag cross-correlation determinations amongst the at least two of the volumes of the set of the plurality of volumes.

17. The method of claim 1, wherein the subset of correlated volumes comprises volumes of the set of the plurality of volumes determined to be similar to one another based on semblance between the volumes of the set of the plurality of volumes.

18. The method of claim 1, wherein the subset of correlated volumes comprises volumes of the set of the plurality of volumes determined to be similar to one another based on semblance between illumination maps corresponding to each volume of the set of the plurality of volumes.

19. The method of claim 1, wherein the subset of correlated volumes comprises volumes of the set of the plurality of volumes determined to be similar to one another based on semblance between phase/amplitude maps corresponding to each volume of the set of the plurality of volumes.

20. The method of claim 1, wherein the subset of correlated volumes comprises volumes of the set of the plurality of volumes determined to be similar to one another based on semblance between an attribute corresponding to each volume of the set of the plurality of volumes.

* * * * *